United States Patent [19]

Howe et al.

[11] 4,095,676

[45] Jun. 20, 1978

[54] STORED ENERGY OPERATOR FOR BREAKERS

[75] Inventors: Francis M. Howe, Carmel; Simon Yin, Fremont, both of Calif.

[73] Assignee: Howe-Yin Research Co., Inc., Fremont, Calif.

[21] Appl. No.: 744,243

[22] Filed: Nov. 23, 1976

[51] Int. Cl.[2] .......................... H01H 3/30; F03G 1/08

[52] U.S. Cl. ............................ 185/40 R; 200/153 SC

[58] Field of Search ................. 185/40 R, 40 A, 40 B, 185/40 C, 40 D, 40 E, 40 F, 40 H, 40 L, 40 M, 40 S; 200/153 SC

[56] References Cited

U.S. PATENT DOCUMENTS

| | | | |
|---|---|---|---|
| 3,203,505 | 8/1965 | Hannauer | 185/40 R |
| 3,254,186 | 5/1966 | Fischer | 200/153 SC |
| 3,689,721 | 9/1972 | McGuffie | 185/40 R |
| 3,898,409 | 8/1975 | Liebig et al. | 185/40 R X |

*Primary Examiner*—Allan D. Herrmann

[57] ABSTRACT

A vacuum breaker operator in which a breaker closing drive spring is charged by a charging mechanism including a drive lever mounted on a drive shaft coupled to compress the spring as the lever is rotated. A drive gear is rotatively mounted on the drive shaft. Coupling means couple the drive gear to rotate the drive shaft to rotate the lever and charge the spring during a charging operation and decouple the driven gear during a spring discharging operation. A drive linkage is coupled to said spring and serves to close the breaker when the spring is discharged. An opening spring is coupled to said drive lever linkage and adapted to be charged by the drive spring and provides the energy for opening the breaker. A reciprocating pawl drives the driven gear from a power source and means are provided for disengaging the pawl when the drive spring is charged allowing the pawl to engage the gear when the spring is discharged whereby the gear can be rotated to recharge the drive spring after a discharging operation.

7 Claims, 6 Drawing Figures

STORED ENERGY OPERATION FOR BREAKERS

BACKGROUND OF THE INVENTION

This invention relates generally to a stored energy breaker operator in whcih the energy for closing and opening the operator is stored in springs charged by a charging mechanism including a pawl driven gear.

Breaker operators employing springs for storing the operating energy are known in the art. One type of such operator, of which this invention is an improvement, includes a pawl driven gear directly coupled to a mechanism which charges the spring. The gear is driven over center when the spring is compressed whereby the gear continues to rotate in the same direction when the spring energy is released for closing or operating the breaker. However, after the spring is discharged, it continues to oscillate and the gear teeth strike the drive and holding pawls causing severe wear of the pawls and gear and often causing breakage of the gear teeth. As a consequence, the stored energy operator can only be operated a limited number of times before it must be removed from service and overhauled.

OBJECTS AND SUMMARY OF THE INVENTION

It is a general object of the present invention to provide a stored energy breaker operator including a driven gear which is adapted to be coupled to the spring charging mechanism during a charging operation and decoupled therefrom during a discharging operation.

It is another object of the present invention to provide a stored energy breaker operator in which a drive lever which supplies the energy for compressing the spring is mounted upon a shaft which is coupled to a drive gear during a spring charging operation and decoupled from said charge gear during a spring discharging operation.

It is further object of the present invention to provide a stored energy breaker operator in which means are provided for disengaging the driving pawl when the spring is fully charged.

It is a further object of the present invention to provide a stored energy operator for a breaker which is simple in construction and can be operated a large number of times before it must be removed from service for repair.

The foregoing and other objects of the invention are achieved by a stored energy operator which includes a drive spring for storing energy for operating an associated breaker, a drive lever including a drive shaft for charging such spring, a driven gear rotatably carried on said drive shaft, and means for coupling said gear to said drive shaft during a charging operation and decoupling said gear from said drive shaft when the spring is discharged to operate the associated breaker.

DESCRIPTION OF PREFERRED EMBODIMENTS

Figure 2:
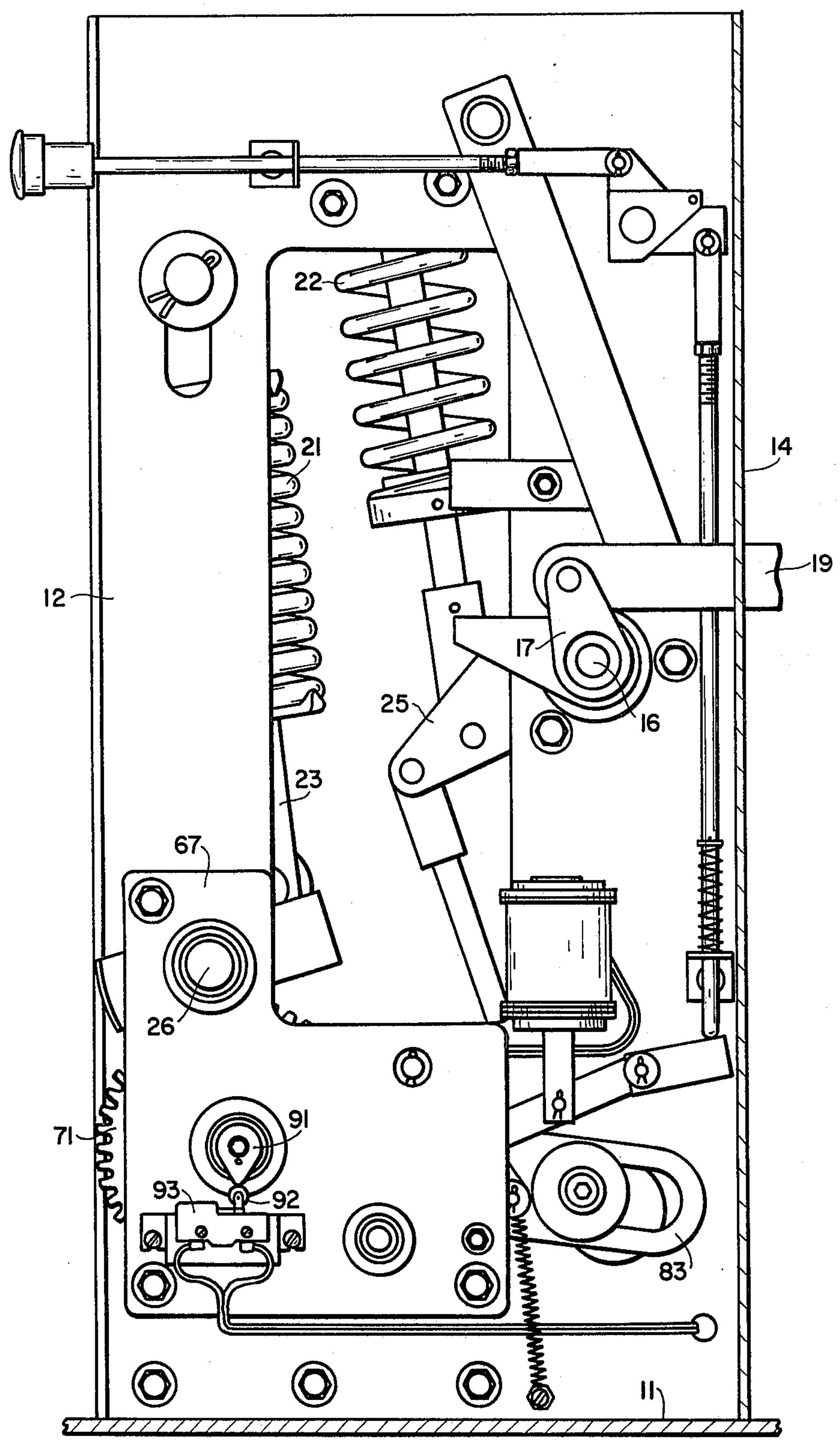
FIG. 2 is a side elevational view of the operator shown in FIG. 1.

The breaker operator of the present invention includes a base 11 which supports a pair of spaced side plates 12 and 13 and front plate 14 all suitably attached to the base and to each other. A drive shaft 16 is journalled in the side plates and is provided with a pair of spaced drive links 15 and 17 at each end. Each pair of spaced drive links serves to receive the end of drive rods one of which is shown at 19 FIG. 2. The rods extend through the front plate 14 and are adapted to actuate or operate an associated breaker. By rotation of the drive shaft the drive rods are moved forward and back for closing and opening associated breakers. A drive rod (not shown) is also disposed at the center of the drive plate and is driven by the spaced drive levers 25, FIG. 3, supported on the drive shaft 16.

Figure 1:
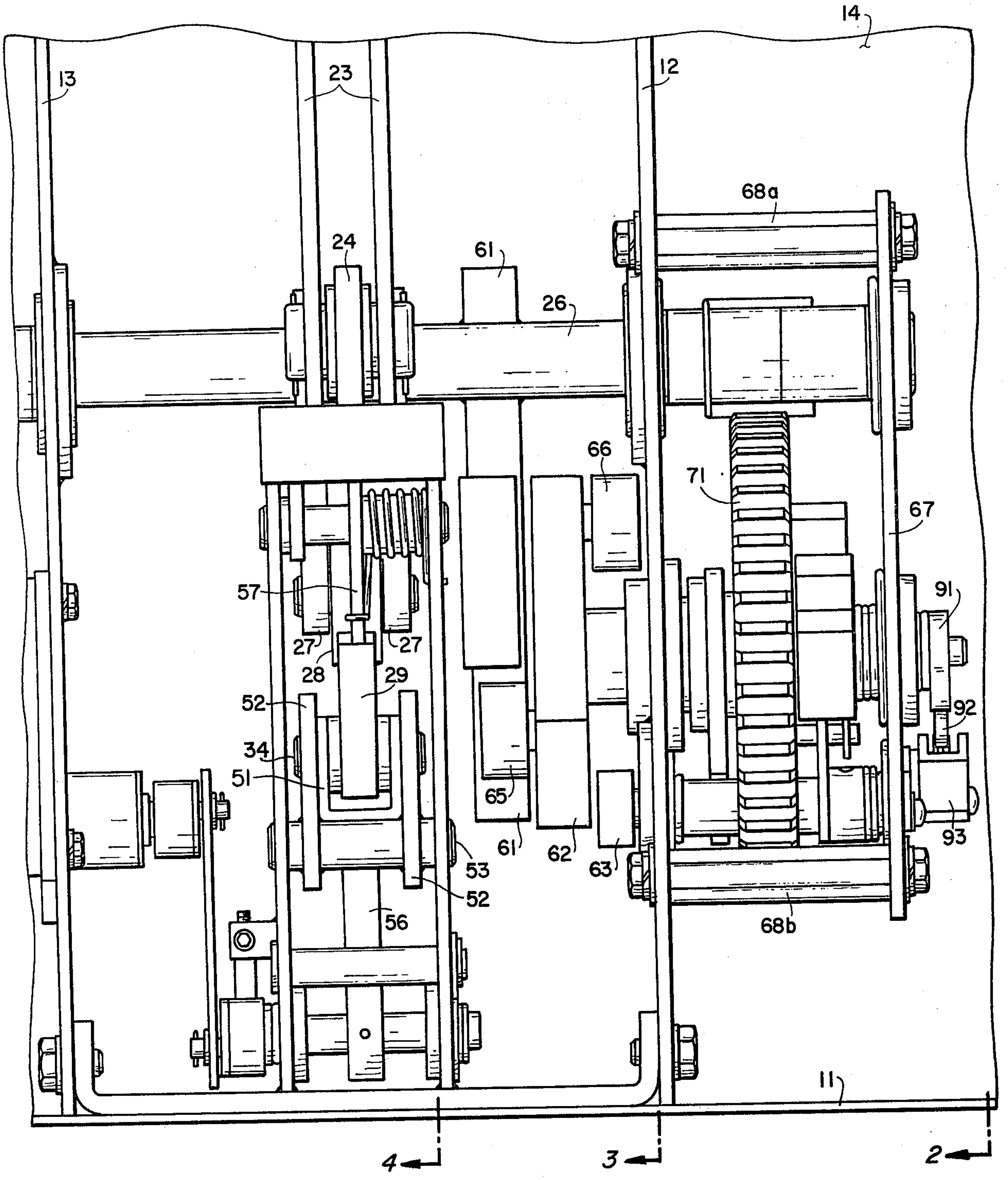
FIG. 1 is an elevational view showing a stored energy operator for breakers in accordance with the present invention.
Figure 3:
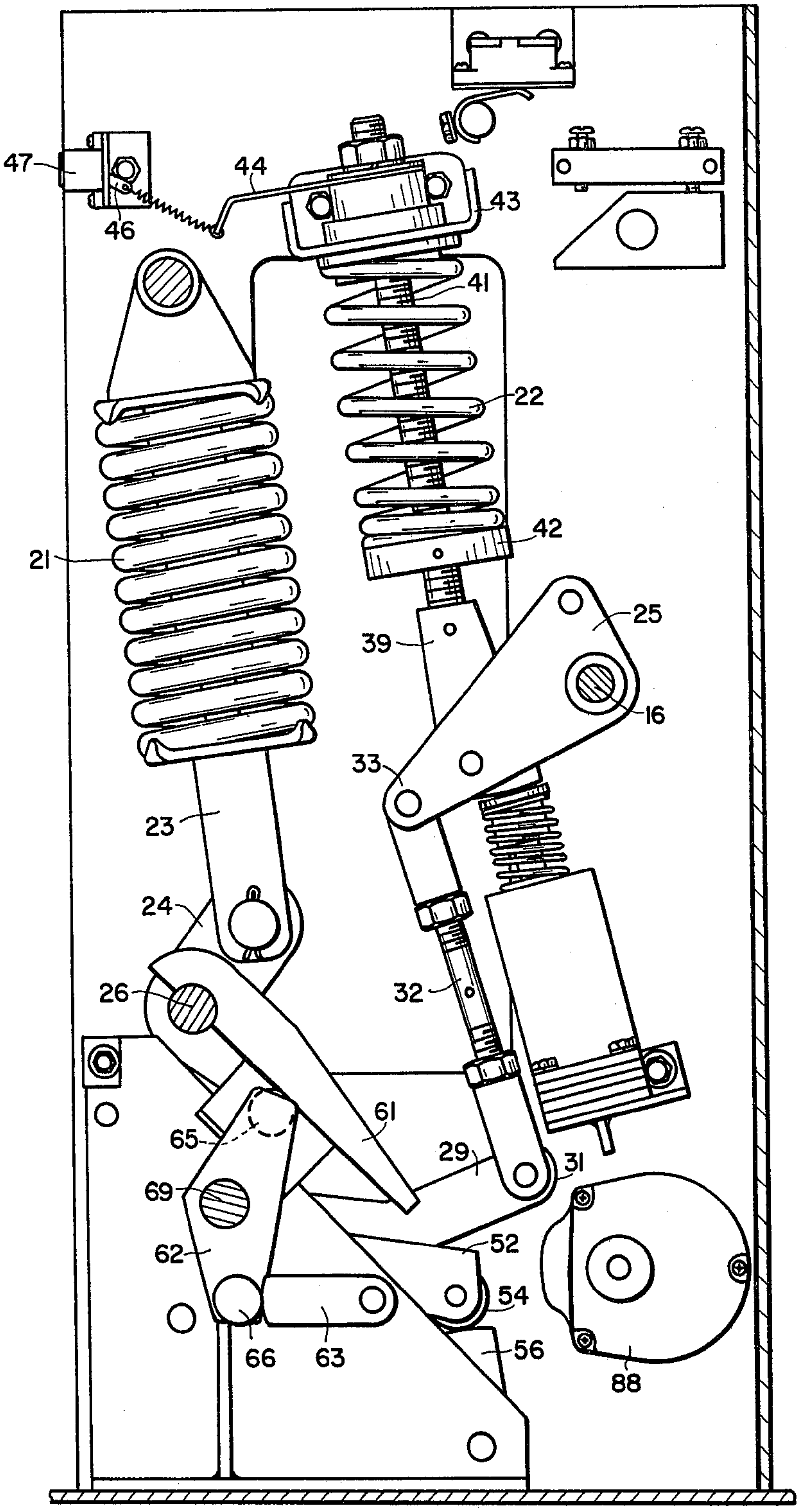
FIG. 3 is a sectional view taken along the line 3—3 of the operator of FIG. 1.
Figure 4:
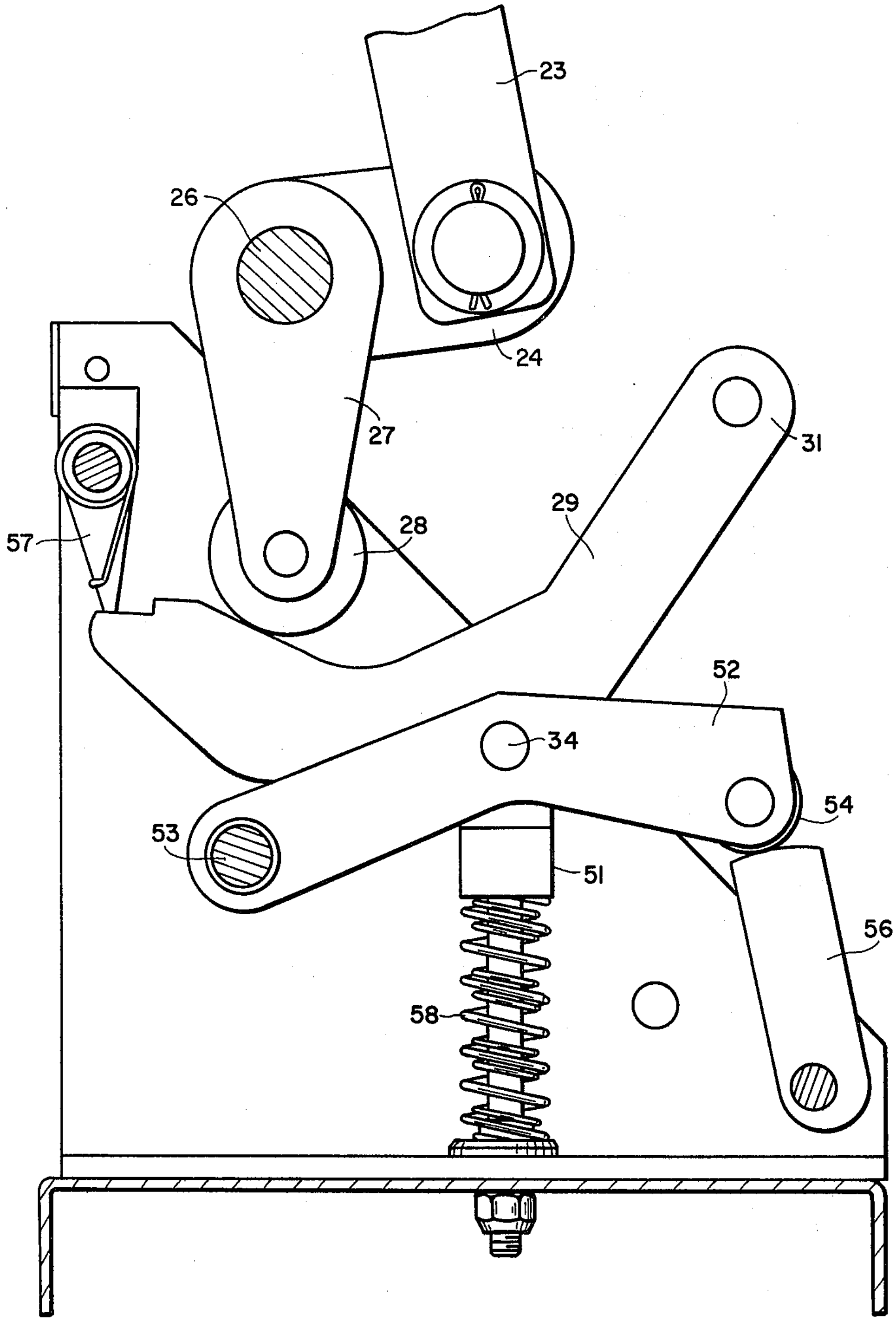
FIG. 4 is a sectional view taken along the line 4—4 of the operator of FIG. 1.

The drive shaft 16 is driven by means of energy stored in springs 21 and 22. The spring 21 provides the breaker closing force and having a substantially greater spring constant than the spring 22 which provides the breaker opening force. Referring more particularly to FIGS. 1, 3 and 4, the spring 21 is associated with spring shafts 23 which are connected to an arm 24 secured to a drive shaft 26. A cam roller arm 27 is secured to the shaft 26, FIG. 4, and serves to be rotated by the shaft to thereby move the roller 28 carried at its other end against the toggle cam 29 when the shaft 26 is rotated by the spring force through the arm 24. The cam 29 has its end 31 secured to the forked end of an adjustable drive link 32 connected to the end 33 of the drive levers 25 carried by the shaft 16, FIG. 3. When the spring is discharged, it rotates the arm 24 in a clockwise direction rotating the shaft 26 and bringing the bearing 28 against the toggle cam 29 rotating the cam around the pivot 34 to rotate the levers 25 in a clockwise direction thereby rotating the shaft 16 and closing the associated breaker. At the same time the force of the spring 21 serves to compress the spring 22 which is held in a charged condition. When the spring 22 is discharged, as will be presently described, it rotates the levers 25 in a counter clockwise direction opening the breaker. Thus it is seen that the total energy for operating the operator is contained and stored in the spring 21. When the spring 21 is released, it rapidly closes the breaker and also compresses the spring 22 which then provides the energy for opening the breaker. The operator described is particularly useful for driving the moving contact of high voltage vacuum breakers. It rapidly moves the contact to minimize arcing and provides substantial forces to maintain an intimate contact.

The spring 22 is compressed by lifting the return spring connector block 39 connected to the end of shaft 41. An adjustable retainer 42 is threaded to the shaft 41 and drives and compresses the spring against the stop 43. The shaft 41 moves upwardly and serves to move the arm 44 which moves the toggle 46 on a toggle counter 47 which provides a count of the number of times that the spring is compressed and the operator activated.

Referring again to FIG. 4, the toggle cam pivot 34 is shown held by means of a spring actuated fork 51. The pivot 34 also carries an arm 52 which has one end fixed to shaft 53. Its other end is provided with a roller 54 which bears against the trip opening stop 56. The trip opening stop 56 is shown in the position which it obtains during a discharge of the main spring whereby the solid support between the shaft 53 and the roller 54 prevents compression of the spring 58 associated with the fork 51 and permits the transfer of energy to close the breaker. By rotating the stop 56 clockwise out from under the roller 54, the force of the spring 22 pushing down on the rear end of the toggle cam 29 causes the toggle cam 29 and the arm 52 to rotate in a clockwise direction around the pivot shaft 53 and compress spring 58. When the front end of the toggle cam 29 clears the stop 57, the force of the discharging spring 22 continues to push the rear end of the cam 29 down. Simultaneously, spring 58 pushes pivot shaft 34, arm 52, and the center portion of the cam 29 upwardly thereby clearing the way for cam 56 to return to its initial position and support roller 54.

Figure 5:
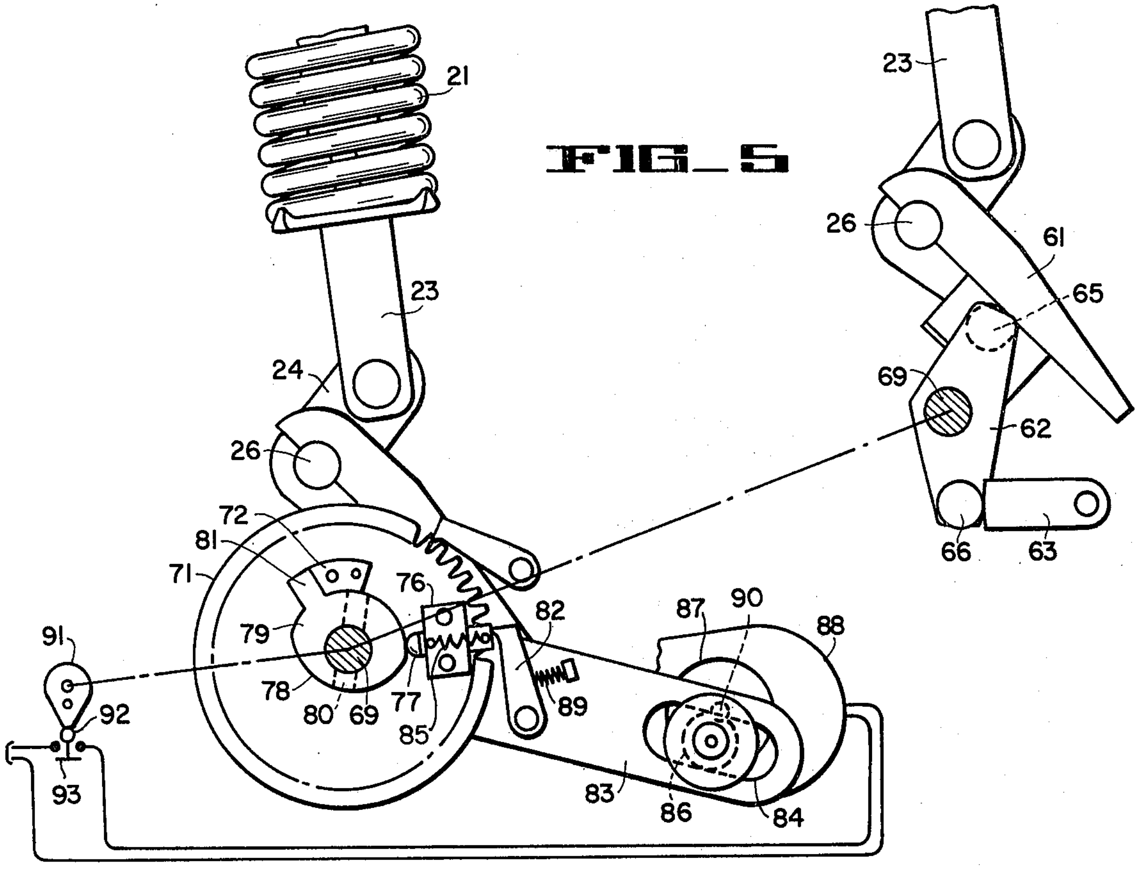
FIG. 5 is an schematic view showing the charging mechanism with the main spring in its charged condition.
Figure 6:
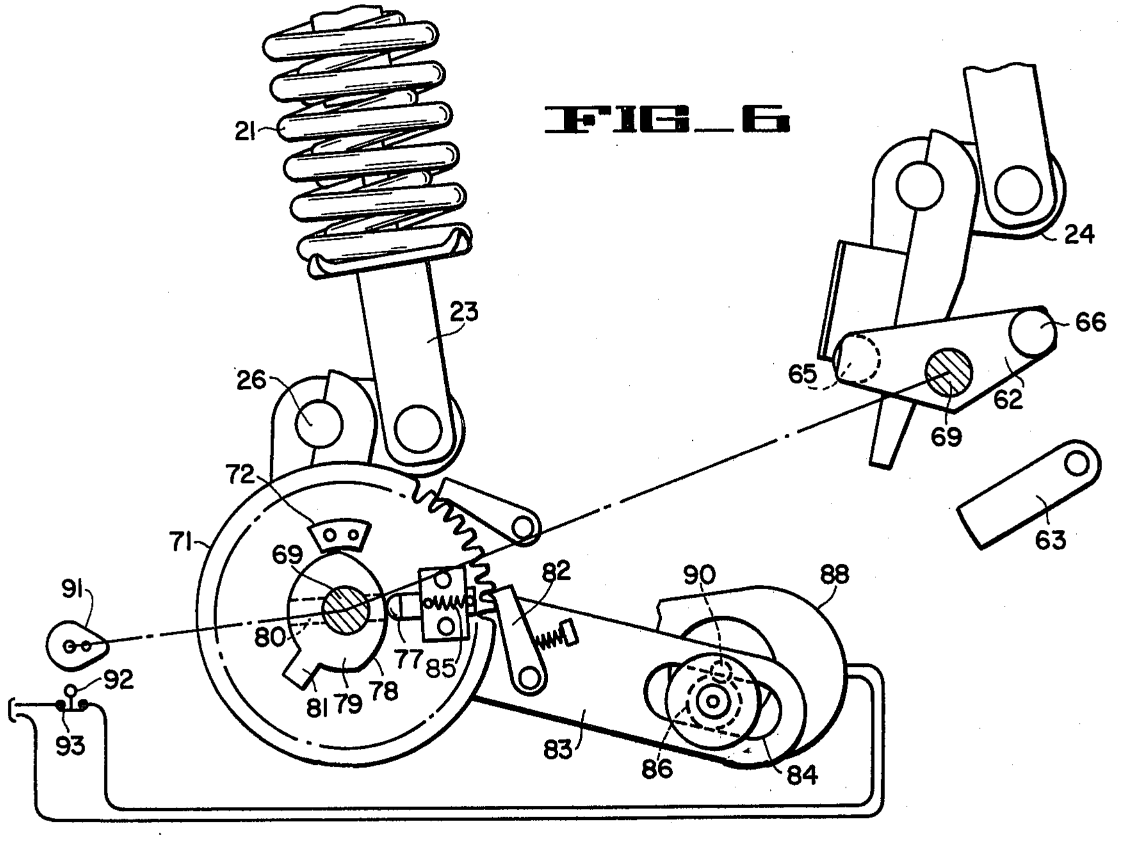
FIG. 6 is a schematic view showing the charging mechanism with the main spring in its discharged condition.

The spring charging arrangement in accordance with the present invention is shown in greater detail in FIGS. 1, 2, 3, 5 and 6. The spring 21 is charged by rotating lever 61 attached to the shaft 26. When the lever 61 is rotated, it drives the arm 24 in a counter clockwise direction to urge the spring shafts 23 upwardly and to compress the spring 21 as shown in FIG. 5. The lever 61 is caused to rotate in a counter clockwise direction by means of a drive lever 62 which carries a drive roller 65 which engages the lever 61. As the drive lever 62 is rotated in a counter clockwise direction and compresses the spring. The drive lever 62 is shown in its locked position in FIG. 5 whereby the spring is fully charged and the lever is prevented from rotating by means of the stop 63 abutting the stop roller 66. In this position the spring is charged and in readiness to be discharged and close the associated breaker through the linkage previously described. The spring is discharged by rotating the cam 63 in a counter clockwise direction thereby permitting the drive lever 62 to rotate counter clockwise under the force of the spring 21 and arm 61 to the position shown in FIG. 6. As previously described, this causes the drive shaft 16 to rotate in the clockwise direction and close the associated breaker and also to compress the opening spring 22.

The shaft 69 extends through the side plate and is journalled between the side plate 12 and plate 67 held to the side plate by means of spacer bolts **68*a*, 68*b*. The shaft 69 rotatably carries a gear 71 which includes a suitable bushing and is adapted to rotate freely on the shaft. The outer face of the gear 71 carries a drive block 72 which rotates with the gear 71. The gear 71 also carries a pawl lift assembly which rotates with the gear. The assembly includes a guide 76 and a spring loaded pawl lift 77 having one end adapted to engage a drive pawl 82 and the opposite end adapted to follow the surface of cam 78 which is a part of the drive hub 79 affixed to the shaft 69 by means of a pin 80. The drive hub 79 is provided with an ear 81 which is adapted to be engaged by the drive block 72 to drive the shaft 69 to thereby rotate the associated drive lever 62 to charge the spring 21**.

The gear 71 is rotated or driven by means of a reciprocating pawl 82 attached to the pawl arm 83. The pawl arm 83 has one end held by the shaft 69 and its other end provided with an elongated slot 84 which receives a drive roller 86. The drive roller 86 is eccentrically mounted on the pulley 87 attached to the motor shaft 69. When the motor is energized, the roller 86 moves in a circular motion. The circular motion is translated in an up and down motion of the end of the pawl arm 83 thereby causing the pawl 82 to reciprocate or move up and down. The pawl 82 is spring loaded by a spring 89 and urged to engage the teeth of gear 71 one at a time, once for each revolution of the motor 88, thereby causing the gear 71 to rotate in a counter clockwise direction.

As shown in FIG. 5, the spring 21 is shown fully charged with the pawl lift 77 urged outwardly to disengage the pawl 82 whereby continued energization of the motor 88 will not serve to move the gear 71. However, as the gear 71 obtains the position, as shown in FIG. 5, and the associated shaft 69 obtains the same position, the limit switch cam 91 attached at the end of the shaft 69 strikes the switch arm 92 thereby serving to open the switch 93 and deenergize the motor 88.

Thus, operation of the charging mechanism is to continuously rotate the gear 71 counter clockwise until the drive block 72 strikes the ear 81 and causes the shaft 69 to rotate thereby rotating the associated drive lever 62 to drive the lever 61 and charge the spring 21. As the gear 71 reaches the position shown in FIG. 5, the pawl 82 is disengaged, the motor 88 turned off, and the operator is in readiness to be discharged and close the associated breaker.

When the breaker receives a closed command, the breaker closing stop 63 is rotated downward and disengages from the stop roller 66. The discharging spring 21 closes the breaker contacts, as previously described. The shaft 69 is rotated back to the discharge position by the descending arm 61 rotating the drive lever 62 such that it completes approximately 180° of rotation to its initial position, FIG. 6, where it once again can perform a spring charging operation. The shaft 69 and drive hub 79 rotate with the drive lever. The drive hub 79 rotates out of contact with the drive block 72. Since there is no direct engagement between the gear 71 and the shaft 69, the gear 71 remains stationary.

When the spring 21 is discharged, the rotation of the drive hub 79 is such that the pawl lift 77 follows the cam surface 78 of the drive hub 79 until the pawl lift 77 is pulled back by the pawl lift spring 85 permitting the drive pawl 82 to engage the gear 71. The charging motor limit switch 93 now allows the motor to be turned on and once again repeat the spring charging operation.

It is seen that the gear 71 and the shaft 69 are decoupled whereby the damped oscillations caused by contraction and expansion of the spring 21 are not transmitted to the gear system during a discharge operation. The gear 71 remains stationary and collision and severe wear of the gear 71 and the pawls are eliminated.

What is claimed is:

1. A stored energy operator for breakers which includes a spring adapted to be compressed for storing energy for operating an associated breaker when the spring is released, a spring arm mounted on a spring shaft for compressing said spring, a lever mounted on said spring shaft to rotate said shaft and spring arm to compress said spring, a drive lever including a drive shaft for rotating said lever, a driven gear rotatably carried on said drive shaft, and means for coupling said gear to said drive shaft during spring compression and decoupling said gear from said drive shaft when the spring is released to operate the breaker.

2. A stored energy operator for breakers as in claim 1 including a drive linkage coupled to said spring to close the breaker when the spring is released.

3. A stored energy operator for breakers as in claim 2 including an opening spring coupled to said linkage and adapted to be compressed by said drive spring when it is released.

4. A stored energy operator for breakers which includes a spring for storing energy for operating an associated breaker when the spring is released, means for compressing said spring, a drive lever including a drive shaft for driving said means for compressing said spring, a driven gear rotatably carried on said drive shaft, means for coupling said gear to said drive shaft during compression of said spring and decoupling said gear from said drive shaft when the spring is released to operate the associated breaker, a reciprocating pawl for engaging and driving said gear, and means for disengaging said pawl when the spring is compressed and allowing the pawl to engage the gear when the spring is released.

5. A stored energy operator for breakers as in claim 4 in which said means for disengaging said pawl includes a cam mounted on said drive shaft for rotation therewith and a pawl lift adapted to follow the surface of said cam.

6. A stored energy operator as in claim 4 wherein said pawl is motor driven and means are included for turning off said motor when the drive spring is compressed.

7. A stored energy operator for breakers which includes a spring for storing energy for operating an associated breaker when the spring is discharged, a spring charging lever connected to charge said spring, a drive lever including a drive shaft, a roller carried by said drive lever and adapted to engage said spring charging lever whereby rotation of said drive shaft and lever rotates the spring charging lever to charge the spring, a driven gear rotatably carried on said drive shaft, and means for coupling said gear to said drive shaft during a charging operation and decoupling said gear from said drive shaft when the spring is discharged to operate the breaker.

* * * * *